2,865,791
METAL NITRIDE COATING PROCESS

Wilhelm Ruppert and Gottfried Schwedler, Frankfurt am Main, Germany, assignors to Metallgesellschaft Aktiengesellschaft, Frankfurt am Main, Germany, a corporation of Germany No Drawing. Application February 28, 1955
Serial No. 491,194

Claims priority, application Germany March 5, 1954

5 Claims. (Cl. 117—106)

This invention relates to a process of coating surfaces with nitrides of metals of the fourth and fifth groups of the periodic system, such as titanium, zirconium, vanadium and columbium, which nitrides are produced from ammonia and a halide of the nitride-forming metal.

A number of processes are known for the production of coatings of nitrides of the metals of the fourth and fifth groups of the periodic system. According to these processes, e. g., coatings of titanium nitride are deposited by a reaction of titanium halide or an organic titanium compound with nitrogen and hydrogen at elevated temperatures. For a successful performance of these processes a very high degree of purity of the nitrogen and hydrogen from water vapor and oxygen is required. This is undesirable where larger plants are to be supplied with the necessary quantities of gases because in those cases the usual purification of the gases is usually imperfect unless expensive purifying processes are employed.

It is an object of the invention to provide a process of coating metallic or nonmetallic surfaces with nitrides of metals of the fourth and fifth groups of the periodic system, in which said nitrides are deposited by a reaction of a halide of said metal with a gas which can easily be obtained with high purity in large quantities.

Ammonia can easily be produced in the required purity. Moreover, it is most probable that ammonia and its decomposition products are intermediates in the formation of the nitrides. For experimental work the use of ammonia has the advantage that the starting volumes are reduced compared to the previously used nitrogen-hydrogen mixtures.

On the other hand, the application of ammonia entails the difficulty that the halides, particularly the chlorides, of metals of the fourth and fifth groups of the periodic system form with ammonia at low temperatures complex compounds of low volatility, which while decomposing at higher temperatures do not give perfect nitrile coatings.

It is another object of the invention to provide a process of coating metallic or nonmetallic surfaces with nitrides of metals of the fourth and fifth groups of the periodic system, in which nitrides are deposited by a reaction of a halide of said metal with ammonia while avoiding a formation of complex compounds between ammonia and said metal halides.

With these and other objects in mind, which will become apparent as the specification proceeds, the invention teaches to react halides of metals of the fourth and fifth groups of the periodic system with ammonia in a nitride building zone disposed adjacent to the surfaces to be coated and maintained at temperatures above the decomposition temperature of the complex compounds possible between ammonia and said halides.

To this end the halides are contacted by the ammonia only at temperatures which are above the decomposition temperature of the complex compounds possible between the metal halides and ammonia. In the simplest case ammonia and the halides of the nitride-forming metals are introduced separately into the reaction space, which is maintained at a temperature above the decomposition temperature of the complex compounds.

Alternatively titanium halides may be formed in the reaction space in a zone which has a lower temperature than the depositing zone for the nitride, whereas the ammonia is introduced only into the higher-temperature zone where the deposition takes place. In this case the halide can be formed by passing hydrogen halide over the nitride of the nitride-forming metal.

When proceeding according to the invention, using ammonia and introducing the ammonia separately into the nitride building zone, perfect nitride coatings will be obtained from reactants which can easily be obtained in larger quantities with sufficient purity.

The process has the additional advantage that it can be performed with smaller volumes of the starting gases than are required in the known processes using a mixture of hydrogen and nitrogen. Thus thicker coatings can be obtained in shorter time.

The coatings are hard, wear-resistant, corrosion- and erosion-resistant.

The process according to the invention may be explained with reference to an example of forming titanium nitride coatings from titanium tetrachloride and ammonia.

Titanium tetrachloride forms with ammonia complex compounds of different composition. When heated to elevated temperatures these complex compounds decompose by way of various compounds, which have not been investigated fully, to form titanium nitride. The decomposition temperatures lie between 300 deg. C. and 650 deg. C. Above 650 deg. C. a formation of complex compounds has not been observed.

To form coatings of titanium nitride, titanium tetrachloride is reacted with ammonia adjacent to the surface to be coated, at temperatures above 650 deg. C., preferably at 900 deg. C. to 1200 deg. C. To avoid a deposition of suspended particles of titanium nitride on the surfaces to be coated, titanium tetrachloride and ammonia are separately introduced into the reaction zone. The evaporation and introduction of titanium tetrachloride may be effected with the aid of a hydrogen stream. When producing the coatings it must be observed that the treating temperature lies below the melting point of the material to be coated and that the temperature is preferably chosen in such a way that the material to be coated does not suffer any permanent modifications disadvantageous for its use. E. g. preferably the treating temperatures chosen in the coating procedure with steels must not be so high that a hardening treatment necessary can no longer be carried out. If it is necessary, e. g. if a coarse crystalline coating shall be produced, to carry out the formation of nitride coatings at high temperatures, then as material for the object to be coated with nitride a ground material of a high melting point is to be chosen, eventually ceramic materials such as pythagoras mass or sintered alumina.

As material for the reaction containers materials are suitable which at high temperatures are not attacked by the reaction gases, especially by the halides contained therein. E. g. containers from heat-resisting steels provided at their inner surface with coatings of the nitrides to be coated, or containers from quartz can be used.

Example

A drawing die was produced out of hardenable steel and the drawing surface to be coated with nitride was ground and polished. The die was suspended with a holding-device in the reaction container consisting of quartz, the container was closed, the air contained therein was eliminated and replaced by ammonia. In an electric furnace the container was heated up to 900° C. and by separated feeders ammonia and titaniumtetrachloride were introduced into the reaction room which was at a temperature of 900° C. The gases were adjusted so that ammonia was in the surplus. After 2½ hours the addition of titaniumtetrachloride was cut off and the reaction room was cooled to room temperature while still under ammonia.

A coating of titanium nitride of 25µ thickness had formed which was polished. The drawing die may be hardened.

What is claimed is:

1. A process for coating surfaces with titanium nitride which comprises introducing separately a titanium halide and ammonia in a nitriding zone adjacent to the surfaces to be coated maintained at a temperature above the decomposition temperature of the complex compounds of ammonia with the titanium halide, said ammonia and said titanium halide being brought into contact with each other only at a temperature above said decomposition temperature.

2. The process of claim 1 in which an excess of ammonia is maintained in said nitriding zone.

3. The process of claim 1 in which said titanium halide is titanium tetrachloride and said nitriding zone is maintained at a temperature above 650° C.

4. The process of claim 3 in which said nitriding zone is maintained at a temperature between 900 and 1200° C.

5. A process for coating surfaces with titanium nitride which comprises introducing separately a titanium halide and ammonia in a nitriding zone adjacent to the surfaces to be coated maintained at a temperature above the decomposition temperature of the complex compounds of ammonia with the titanium halide, said ammonia and said titanium halide being brought into contact with each other only at a temperature above said decomposition temperature, said titanium halide being formed by passing a hydrogen halide over titanium nitride.

References Cited in the file of this patent

UNITED STATES PATENTS

| 448,915 | Erlwein | Mar. 24, 1891 |
| 1,761,936 | Schluchter | June 3, 1930 |
| 1,794,810 | Van Arkel et al. | Mar. 3, 1931 |
| 1,902,676 | Sutton et al. | Mar. 21, 1933 |
| 2,191,331 | Liempt | Feb. 20, 1940 |

FOREIGN PATENTS

| 10,741 | Great Britain | of 1890 |
| 10,742 | Great Britain | of 1890 |
| 621,890 | Great Britain | Apr. 21, 1949 |
| 722,797 | Great Britain | Feb. 2, 1955 |